(12) United States Patent
Lamp et al.

(10) Patent No.: US 11,957,138 B2
(45) Date of Patent: Apr. 16, 2024

(54) PROTEIN PRODUCT FROM PLANTS AND YEASTS AND PRODUCTION PROCESS FOR SAME

(71) Applicant: VERBIO VEREINIGTE BIOENERGIE AG, Leipzig (DE)

(72) Inventors: Anne Lamp, Hamburg (DE); Julia Pohl, Dessau-Roßlau (DE); Fabian Bonk, Leipzig (DE); Michael Schlimbach, Halle/Saale (DE); Wolfram Klein, Leipzig (DE); Oliver Lüdtke, Markkleeberg (DE)

(73) Assignee: VERBIO VEREINIGTE BIOENERGIE AG, Deutschland (DE)

( * ) Notice: Subject to any disclaimer, the term of this patent is extended or adjusted under 35 U.S.C. 154(b) by 0 days.

(21) Appl. No.: 17/414,024

(22) PCT Filed: Apr. 9, 2020

(86) PCT No.: PCT/EP2020/060174
§ 371 (c)(1),
(2) Date: Jun. 15, 2021

(87) PCT Pub. No.: WO2021/204391
PCT Pub. Date: Oct. 14, 2021

(65) Prior Publication Data
US 2023/0050909 A1    Feb. 16, 2023

(51) Int. Cl.
*A23J 1/00* (2006.01)
*A23J 1/18* (2006.01)
*A23J 3/34* (2006.01)

(52) U.S. Cl.
CPC ............. *A23J 1/005* (2013.01); *A23J 1/18* (2013.01); *A23J 3/346* (2013.01)

(58) Field of Classification Search
CPC ............. A23J 1/005; A23J 1/006; A23J 1/18
(Continued)

(56) References Cited

U.S. PATENT DOCUMENTS

| 4,624,805 A | 11/1986 | Lawhon |
| 9,714,267 B2 | 7/2017 | Emanuele et al. |

(Continued)

FOREIGN PATENT DOCUMENTS

| DE | 20 2009 013 389 U1 | 2/2011 |
| WO | 2012101079 A1 | 8/2012 |

OTHER PUBLICATIONS

International Search Report dated May 28, 2020, in connection with PCT International Application No. PCT/EP2020/060174.
(Continued)

*Primary Examiner* — Subbalakshmi Prakash
(74) *Attorney, Agent, or Firm* — Norris McLaughlin, P.A.

(57) ABSTRACT

The present invention includes a process for producing a protein product from plants and yeasts. The process comprises the steps of:
a) providing a thin stillage or a thin stillage concentrate;
b) separating a protein concentrate from the provided thin stillage from a) by means of solid-liquid separation;
c) diluting the protein concentrate from b) with an aqueous process liquid to a dry substance content of at most 15 wt. %, tempering the diluted protein concentrate to a temperature of at least 60° C., and adjusting the pH of the diluted and tempered protein concentrate to an alkaline pH;
d) cooling the processed protein concentrate from c) and subsequently separating a liquid phase by means of solid-liquid separation;
e) adjusting the pH of the separated liquid phase from d) to an acidic pH, and then separating a solid phase by solid-liquid separation; and (Continued)

f) dispersing the solid phase from e) in a solvent and subsequently separating a product phase by solid-liquid separation, wherein the product phase comprises or includes the protein product from plants and yeasts.

The present invention also discloses a corresponding protein product from plants and yeasts with a crude protein content of at least 70 wt. % DS.

16 Claims, 1 Drawing Sheet

(58) Field of Classification Search
USPC .......................................................... 426/656
See application file for complete search history.

(56) References Cited

U.S. PATENT DOCUMENTS

| | | |
|---|---|---|
| 2014/0024225 A1 | 1/2014 | Hirose et al. |
| 2014/0142282 A1 | 5/2014 | Emanuele et al. |

OTHER PUBLICATIONS

Nandika Bandara et al., "Protein Extraction from Triticale Distillers Grains", Cereal Chemistry, vol. 88, No. 6, Nov. 1, 2011 (Nov. 1, 2011), p. 553-559.

Chatzifragkou Afroditi et al., "Extractability and characteristics of proteins deriving from wheat DDGS", Food Chemistry, Elsevier LTD, NL, vol. 198, Nov. 11, 2015.

Lamp Anne et al., "Protein recovery from bioethanol stillage by liquid hot water treatment", The Journal of Supercritical Fluids, Elsevier, Amsterdam, NL, vol. 155, Sep. 12, 2019; XP085898683.

Anne Lamp et al., "Protein recovery from bioethanol stillage by liquid hot water treatment Time (min) Degradation (C)", Jan. 1, 2020 :https://ars.els-cdn.com/content/image/1-s2.0-S0896844619303596- mmc1; XP055695904.

Anne Lamp et al.: "Supplementary material- Protein recovery from bioethanol stillage by liquid hot water treatment", The Journal of Supercritical Fluids, vol. 155, Jan. 1, 2020; XP055695902.

Anne Lamp: "Proteinen aus Nebenstromen IUE", Tuhh, Nov. 7, 2019 (https://www.tuhh.de/iue/forschung/forschungsgebiete/ag-effiziente-energiesysteme-und-produktionsverfahren/bioraffinerie/proteinen-aus-nebenstroemen.html, XP055695789.

PROTEIN PRODUCT FROM PLANTS AND YEASTS AND PRODUCTION PROCESS FOR SAME

This application is the U.S. National Stage of International Application No. PCT/EP2020/060174, filed Apr. 9, 2020, the disclosures of which are incorporated herein by reference.

The invention relates to a process for producing a protein product from plants and yeasts and to the protein product from plants and yeasts thus produced.

TECHNICAL BACKGROUND

The production of bioethanol from plant-based raw materials is known. In Germany, the amount of bioethanol produced has more than doubled in the last 10 years. The trend for the future is positive, as in the next few years a further reduction of $CO_2$ emissions from fuels is required by law and can be achieved by admixing bioethanol. Important raw materials for bioethanol production are cereals such as rye, corn, wheat and triticale.

For bioethanol production, the cereal is ground, mashed and fermented with the addition of yeast. The fermented mash is sent for distillation, during which the separation of the ethanol produces what is known as the stillage (synonym: thick stillage), which is made up of organic components of the mash that have not been converted into ethanol, and also salts and yeast.

Stillage is typically used directly as a raw product, in dried form or in the following further forms as animal feed:
  thin stillage (liquid phase from solid-liquid separation of stillage)
  stillage solids (solids from solid-liquid separation of stillage)
  thin stillage concentrate (evaporated thin stillage)
  DDGS ('dried distillers grains with solubles'=dried mixture of thin stillage concentrate and stillage solids)

Of the above-mentioned feeds, thin stillage or thin stillage concentrate has the highest crude protein content. However, the crude protein content is only in the range between 20 and 39 wt. % DS, which results in a low sales value.

Furthermore, stillage-based feeds often contain a high fibre content, which makes such feeds unattractive for the food industry.

In order to increase the added value and enable use in the food industry, a product with a crude protein content of at least 70 wt. % DS in combination with nutritive properties is required. Thin stillage is particularly suitable as a starting material for producing a protein product from plants and yeasts for the food industry, as it has the highest crude protein content among the feeds. Using stillage, DDGS or stillage solids as raw material increases the operational effort, as all of them have a lower crude protein content than thin stillage.

Known processes to obtain a product with a high crude protein content from thin stillage achieve higher, but not sufficiently high crude protein contents.

For example, a raw protein content of at most 30.5 wt. % DS has been achieved by filtration and spray drying of thin stillage from cereal processing (DE 20 2009 013 389 U1). By means of sequential filtrations, at most 50 wt. % DS crude protein content has been achieved so far (REIS, C. E. R., RAJENDRAN, A., HU, B. New technologies in value addition to the thin stillage from corn-to-ethanol process. Reviews in Environmental Science and Bio/Technology March 2017, Volume 16, Issue 1, p. 175-206). In addition, washing and drying of thin stillage from cereal processing achieved a crude protein content of at most 60 wt. % DS (Ratanapariyanuch, K., Shim, Y. Y., Emami, S., Reaney, M. J. T. Protein Concentrate Production from Thin Stillage. J. Agric. Food Chem. 2016, Volume 64, Issue 50, p. 9488-9496).

Higher protein contents cannot be achieved by these processes either, because components such as hemicellulose, crude fat or starch, which make up a large part of the thin stillage, remain in the solids with the proteins.

A tricanter can be used to separate thin stillage into an oil fraction, an aqueous fraction and a protein-rich paste containing at most 58.6 wt. % DS crude protein (US 2014/0242251 A1).

Furthermore, the prior art from obvious areas is either not applicable or entails too many disadvantages:

For example, protein isolates from corn mash, which have crude protein contents of up to 73 wt. % DS are known (U.S. Pat. No. 4,624,805 A). The disadvantage of these products is that they are not obtained from residual materials such as thin stillage, but from the unfermented raw material corn mash and are therefore less sustainable. Also, compared to thin stillage, corn mash does not contain yeasts, which have a positive influence on the nutritive and functional properties of protein products. Another disadvantage is that corn mash consists mainly of starch compared to thin stillage. The crude protein content of corn mash is only about 8 wt. % DS and a large part of the proteins is bound between starch grains. In contrast, thin stillage has already undergone fermentation, in which most of the starch is broken down, and distillation, which causes further breakdown of the organic polymers and structures. This results in different protein extraction requirements for corn mash compared to thin stillage.

Accordingly, there is a continuing need for efficient production processes for high-quality protein products from plants and yeasts with a high crude protein content, in which by-products of bioethanol production, such as thin stillage, are used as raw materials in the interests of sustainability.

SUMMARY OF THE INVENTION

The present invention addresses the problem described above and solves it by providing a process for producing a protein product from plants and yeasts with the steps mentioned in claim 1:
  a) providing a thin stillage or a thin stillage concentrate
  b) separating a protein concentrate from the provided thin stillage from a) by means of solid-liquid separation;
  c) diluting the protein concentrate from b) with an aqueous process liquid to a dry substance content of at most 15 wt. %, tempering the diluted protein concentrate to a temperature of at least 60° C., and adjusting the pH of the diluted and tempered protein concentrate to an alkaline pH;
  d) cooling the processed protein concentrate from c) and subsequently separating a liquid phase by means of solid-liquid separation;
  e) adjusting the pH of the separated liquid phase from d) to an acidic pH, and then separating a solid phase by solid-liquid separation; and
  f) dispersing the solid phase from e) in a solvent and subsequently separating a product phase by solid-liquid separation, wherein the product phase comprises or includes the protein product from plants and yeasts.

From the thin stillage provided in step a), a solid phase, i.e. the protein concentrate, is separated in step b) by means of solid-liquid separation.

In step c), the solid phase from step b), i.e. the protein concentrate, is diluted with an aqueous process liquid to a maximum dry substance content of 15 wt. %. The dilution of the protein concentrate lowers the viscosity, which simplifies handling. Aqueous process liquids may be selected from the group comprising: water, condensates from evaporation of the thin stillage or evaporation of the clear phases and mixtures thereof. The condensates from evaporations of the thin stillage or evaporations of the clear phases contain less than 1.0 wt. % of ethanol and volatile organic acids. The diluted protein concentrate is then tempered to a temperature of at least 60° C. The diluted tempered protein concentrate is subjected to an alkaline treatment by adjusting the pH to alkaline. Subsequently, the reaction mixture thus obtained can react over a defined residence time.

In step d), the processed protein concentrate from step c) is cooled and then a liquid phase is separated by means of solid-liquid separation. That is to say, the reaction mixture from c) is cooled and fed to a solid-liquid separation which separates the reaction mixture into a solid phase and a liquid phase, the liquid phase being separated for the subsequent step. Cooling the processed protein concentrate after the alkaline treatment has the advantage that the hydrolysis reactions of non-protein-containing substances are slowed down and their solubility does not increase further. These can then be separated more efficiently during the solid-liquid separation.

In step e), the pH of the separated liquid phase from step d) is adjusted to an acidic pH and then a solid phase is separated by means of solid-liquid separation. In other words, step e) describes an acidic precipitation, in which the liquid phase from d), the so-called alkaline clear phase, is adjusted to an acidic pH. Subsequently, the reaction mixture with acidic pH is fed to a solid-liquid separation, which separates the reaction mixture into a solid phase and a liquid phase, with the solid phase, the so-called acidic pellet, being separated for the subsequent step.

The alkaline treatment in combination with acidic precipitation has the advantage that a large part of the proteins is recovered (increase in yield), but few other substances such as hemicelluloses contaminate the protein product from plants and yeasts (increase in crude protein content). Compared to filtration, acidic precipitation has the advantage that less energy and operating costs are required and the crude protein content of the protein product from plants and yeasts is higher.

In step f), the solid phase from step e) is dispersed in a solvent and then a product phase is separated by solid-liquid separation, wherein the product phase comprises or includes the protein product from plants and yeasts. In other words, the solid phase from e), called the acidic pellet, is washed with a solvent by dispersing it in a solvent and then subjecting it to solid-liquid separation. The solid-liquid separation separates the dispersion into a solid phase and a liquid phase, the solid phase corresponding to the product phase and comprising or including the protein product from plants and yeasts.

The advantages achieved with the invention compared to known processes are in particular that proteins can be separated from many different components by the combination of several washes, solid-liquid separations, alkaline treatment and acidic precipitation, and thus significantly higher crude protein contents of more than 70 wt. % DS can be achieved.

Further, the process may comprise step g), with step g) being: drying the product phase to isolate the protein product from plants and yeasts. Drying is advantageous as the shelf life is significantly increased.

Another aspect of the invention is a protein product from plants and yeasts which is produced by the process described above and has a crude protein content of at least 70 wt. % DS.

Further embodiments are explained in the detailed description and the FIGURE.

BRIEF DESCRIPTION OF THE FIGURES

The invention is explained in more detail below by means of an embodiment example and the associated drawing.

DETAILED DESCRIPTION OF THE INVENTION

In the context of the present invention, an "alkaline suspension" is understood to mean a diluted protein concentrate after alkaline treatment.

In the context of the present invention, "functional properties" is understood to mean the ability of a product to improve the properties of a (food) product by acting, for example, as an emulsifier ("emulsifiability"), as a foam stabiliser ("foamability") and as a gelling agent ("gellability").

In the context of the present invention, the dry substance (DS) is understood to be the solid residue obtained after removing the solvent (e.g. water or ethanol) from a suspension (e.g. from a stillage) or from a solution. That is to say, the solid residue is to be understood as the totality of all previously dissolved or suspended solids (e.g. crude proteins, yeast and salts). The mass of dry substance is called dry matter and can be expressed in kilograms.

In the context of the present invention, dry substance content (DS content) is understood to be the percentage by mass of the dry substance in relation to the total mass of the suspension (e.g. the stillage) or solution. The dry substance content is expressed in percent by weight (wt. %).

In the context of the present invention, "dissolved dry substance" is understood to mean the dry substance present in the filtrate in dissolved form after centrifugation and fine filtration (pore size 0.2 μm) of a diluted starting sample, such as stillage. The dissolved dry substance is given in wt. %.

In the present invention, "crude protein content" means the proportion of crude protein in the dry substance (DS). The crude protein content (CP) of a sample is determined analytically by means of Kjeldahl nitrogen determination. Here, the analytically determined nitrogen content of the sample is multiplied by the conversion factor 6.25 to obtain the crude protein content. This is given in wt. % DS.

In the present invention, the term "stillage" includes the residue from the distillation of a cereal mash containing ethanol. The term "thick stillage" is used synonymously for stillage.

In the context of the present invention, "solid-liquid separation" is understood to mean a process that separates a suspension (e.g. a thin stillage) into a two-phase system comprising a solid phase and a liquid phase. This can be done, for example, by decanting in a two-phase decanter. The solid-liquid separation can preferably take place in a separator or decanter.

In a two-phase system, a solid phase is the phase that has the higher dry substance content. A solid phase can comprise a suspension or a sedimented solid (residue). In a two-phase system, a liquid phase is understood to be the phase which has the lower dry substance content. A liquid phase can comprise a suspension or a clear solution.

The term "clear phase" refers to the liquid phase produced in a solid-liquid separation in the process steps after the generation of thin stillage. "Clear phase stage 1" means the liquid phase produced from the thin stillage provided. The "alkaline clear phase" means the liquid phase produced from the alkaline suspension. The "acidic clear phase" means the liquid phase produced from the acidic suspension.

In the context of the present invention, "thin stillage" is understood to mean a liquid phase (suspension) produced by a solid-liquid separation (e.g. by decantation) of stillage. The dry substance content (DS content) of a thin stillage can preferably be at least 8 wt. %.

In the context of the present invention, "thin stillage concentrate" is understood to mean a thin stillage with increased dry substance content. The DS content of the thin stillage concentrate may preferably be from 21 to 33 wt. %. A thin stillage concentrate can be obtained, for example, by evaporation.

The term "solvent suspension" means the acidic pellet dispersed in solvent. The term "ethanol suspension" means the acidic pellet dispersed in ethanol.

The term "pellet" refers to the solid phase that results from solid-liquid separation. "Alkaline pellet" means the solid phase resulting from the alkaline suspension. "Acidic pellet" means the solid phase resulting from the acidic suspension. "Sv pellet" (solvent pellet) means the solid phase resulting from the solvent suspension.

The term "protein concentrate" refers to the protein-rich solid phase produced by solid-liquid separation of the thin stillage provided.

The term "acidic suspension" describes the alkaline clear phase after addition of concentrated acid.

Within the present invention, the term "stillage solids" means the solid phase which is separated from the stillage by a solid-liquid separation.

During the processing of grain, such as rye, wheat, corn, triticale, barley or combinations thereof, into bioethanol, stillage is produced after the ethanol has been separated from the fermented mash. This is fed (at least partially) to a solid-liquid separation, which is preferably carried out with the aid of a decanter or a filter press. The stillage solids separated in this way are discharged and used, for example, as feed for cattle.

The liquid phase obtained in this way, the so-called thin stillage, has a DS content of approximately 8-17 wt. % and a crude protein content of approximately 20-39 wt. % DS. The proportions of dissolved and suspended dry substance are approximately equal. The majority of the crude protein is in the suspended dry substance, which also contains starch, celluloses and/or hemicelluloses.

Optionally, the thin stillage can be (at least partially) evaporated before further use in order to produce a thin stillage concentrate. Oil can be separated from this concentrate using processes known to a person skilled in the art, such as a tricanter, in order to increase the crude protein content. The resulting condensate from the evaporation can be recycled in the process as an aqueous process liquid.

Oil separation in the processes upstream of the thin stillage production is also possible.

The thin stillage is fed to a solid-liquid separation in step b) and a protein concentrate is produced as the solid phase, which consists predominantly of suspended dry substance. The solid-liquid separation is preferably carried out in a separator or decanter.

Optionally, oil can be separated from the protein concentrate using methods known in the prior art in order to increase the crude protein content.

In order to reduce the fresh water requirement, the liquid phase from step b), the so-called clear phase stage 1, can be fed to an evaporation process. The resulting condensate can then be recycled in the process as an aqueous process liquid and the clear phase concentrate can, for example, be recycled in a biogas plant.

The protein concentrate is diluted to a maximum DS content of 15 wt. %. The advantage is that this makes the protein concentrate pumpable and stirrable. In addition, the subsequent alkaline treatment can proceed more efficiently as heat and mass transfer limitations are minimised. Preferably, the protein concentrate can be diluted to a DS content of from 3 wt. % to 10 wt. % and particularly preferably to 6 wt. % to 9 wt. %.

In preparation for the alkaline treatment, the diluted protein concentrate can be tempered to a temperature of at least 68° C., preferably to at least 72° C., with stirring. Once the temperature has been reached, the pH of the suspension can be adjusted to at least pH 11.5 by adding concentrated alkali. The residence time should preferably be at least 1 min and at most 30 min, and particularly preferably at most 15 min. This combination of temperature, pH and residence time may be particularly advantageous to achieve a crude protein content in the subsequent protein product from plants and yeasts of at least 70 wt. % DS, preferably at least 75 wt. % DS and particularly preferably at least 80 wt. % DS.

After the reaction time has elapsed, the alkaline suspension from step c) is cooled to reduce the reaction rate. The cooling can preferably be done to below 40° C. An advantage is that the solubility of the non-protein containing substances decreases with decreasing temperature.

The cooled alkaline suspension (the processed protein concentrate) then undergoes a solid-liquid separation, and separation of the liquid phase preferably using a decanter or a separator. This should be done soon after cooling, as over time non-protein substances may slowly dissolve, reducing the crude protein content.

The low-protein solid phase from c), the so-called alkaline pellet, can be discharged from the process. It can be supplied for reuse to a biogas plant, for example.

In the next step e), the dissolved proteins in the liquid phase from d), the so-called alkaline clear phase, are precipitated by adding acid with stirring. For this purpose, a pH value in the range 2.5 to 5.5, preferably pH 3.7 to 5.3, can be set. This pH value is particularly advantageous in order to achieve a maximum crude protein content as well as a maximum yield with a minimum use of acid.

At a pH value <2.5, the crude protein content drops significantly because more non-protein substances are precipitated. Likewise, at a pH value >5.5, the yield drops sharply because too few proteins are precipitated.

The acidic suspension thus obtained is fed to a solid-liquid separation, preferably in a decanter or separator.

In order to reduce the fresh water requirement, the liquid phase from step e), the so-called acidic clear phase, can be fed to an evaporation process. The resulting condensate can then be recycled in the process as an aqueous process liquid and the clear phase concentrate can be supplied for reuse to a biogas plant, for example.

The solid phase from step e), the so-called acidic pellet, which contains the precipitated proteins, is subjected to a washing step in step f) with subsequent solid-liquid separation to remove further non-protein substances.

For this purpose, the acidic pellet is finely dispersed in a solvent, preferably using a universal mixer or a disperser. The dispersed acidic pellet can be referred to as a "solvent suspension". It is particularly advantageous to perform the wash with ethanol to remove interfering substances such as lipids still contained therein. Another advantage is that the proteins do not dissolve to any appreciable extent in ethanol, and thus the yield loss remains minimal. The ethanol produced in the bioethanol plant can be used for the washing.

The solid-liquid separation of the solvent suspension can preferably take place in a decanter or separator, in which the product phase (corresponding to the solid phase), the so-called sv pellet, is separated. The separated contaminated ethanol phase (liquid phase) can be fed back into the distillation of the bioethanol process and thus recovered, making the process particularly efficient and resource-saving.

Furthermore, it can be particularly advantageous to subsequently also subject the sv pellet to a water washing and solid-liquid separation in order to remove any water-soluble impurities still contained, such as salts, and thus further increase the crude protein content in the end product. For this purpose, the sv pellet is dispersed in water and the suspension is subsequently subjected to solid-liquid separation.

Optionally, the sv pellet can also be treated enzymatically with hemicellulases, cellulases, lipases, amylases and/or combinations thereof in order to dissolve any non-protein substances still contained. For this purpose, the sv pellet can be resuspended in water until a stirrable suspension is formed. At the end of the enzymatic treatment, a solid-liquid separation takes place in which the dissolved impurities are separated. The separated aqueous clear phase, if necessary after enzymatic treatment of the sv pellet, is fed to an evaporation. The resulting condensate can be recirculated to reduce the fresh water requirement and the clear phase concentrate can, for example, be supplied for reuse to a biogas plant.

Drying of the product phase (if necessary after enzymatic treatment) results in a storable protein product from plants and yeasts which has a DS content of at least 90 wt. % and a crude protein content of at least 70 wt. % DS, preferably at least 75 wt. % DS and particularly preferably at least 80 wt. % DS.

In one embodiment, drying can take place at temperatures lower than 70° C. and in the absence of oxygen. This can avoid oxidation reactions that would darken the product.

The dried protein product from plants and yeasts can be used in the food industry, e.g. for protein shakes, protein bars and comparable foods.

In a preferred embodiment, the process according to the invention can be designed in such a way that the thin stillage or the thin stillage concentrate from step a) is fed to an oil separation. Optionally, oil can be separated from the protein concentrate using methods known in the prior art in order to increase the crude protein content.

In a preferred embodiment, the process according to the invention may be designed such that in step c) the alkaline pH is in the range of pH=10.5 to 12.8, preferably in the range of pH=11.5 to 12.5 and particularly preferably in the range of pH=12.0 to 12.3.

To increase the crude protein content, it can also be advantageous to treat the thin stillage or thin stillage concentrate enzymatically (after oil separation, if necessary) in order to dissolve the non-protein substances, such as lipids, cellulose, hemicellulose or starch, so that these can be separated from the protein-rich solid during the subsequent dilution and solid-liquid separation with the liquid.

In a further preferred embodiment, the process therefore further comprises an enzymatic treatment of the thin stillage or thin stillage concentrate from a) by means of one or more enzymes selected from the group comprising: hemicellulase, cellulase, alpha-amylase, lipase and glucoamylase. This has the advantage of dissolving interfering substances, with interfering substances including all substances that reduce the quality of the protein product from plants and yeasts.

Preferably, the enzymatic treatment can be carried out directly under the conditions (temperature, pH) present in the thin stillage or the thin stillage concentrate (possibly after oil separation). Particularly preferably, the pH value of the thin stillage or the thin stillage concentrate (if necessary after oil separation) can be adjusted to an optimum value for the enzymes by adding lye, such as NaOH, KOH or $NH_4HCO_3$, in order to ensure optimum enzyme activity. Similarly, the temperature can also be adjusted to the requirements of the enzymes. The simultaneous adjustment of pH and temperature is advantageous.

In one embodiment, the dilution of the thin stillage or thin stillage concentrate is carried out prior to the production of the protein concentrate (if necessary, after an enzymatic treatment). This may involve dilution with an aqueous process liquid, preferably in a 1:1 ratio. Subsequently, the solid-liquid separation can take place. Dilution is advantageous because both the viscosity and the content of dissolved dry substance and thus the salt content are reduced. Fresh water or process liquids such as condensates from evaporation plants are best suited for this.

In a further preferred embodiment, the process according to the invention can be designed in such a way that oil separation takes place in the processes upstream of the thin stillage production.

In a further preferred embodiment, the process according to the invention may be designed such that the thin stillage is diluted with an aqueous process liquid prior to separation of the protein concentrate in b), preferably in a ratio of 1:1.

In a further preferred embodiment, the process according to the invention can be designed in such a way that the liquid phase from b), the so-called clear phase stage 1, is fed to an evaporation in order to obtain a clear phase concentrate and a condensate.

In a further preferred embodiment, the process according to the invention can be designed in such a way that the condensates produced during an evaporation are used in the process as an aqueous process liquid.

In a further preferred embodiment, the process according to the invention can be designed in such a way that the clear phase concentrate from the evaporation is supplied for reuse to a biogas plant.

In a further preferred embodiment, the process according to the invention can be designed in such a way that the protein concentrate from b), corresponding to the solid phase from the solid-liquid separation, is fed to an oil separation.

In a further preferred embodiment, the process according to the invention may be designed in such a way that in step c) the dilution is carried out to a DS content from 3 to 10 wt. %, particularly preferably from 6 to 9 wt. %.

In a further preferred embodiment, the process according to the invention may be configured such that in step c) the temperature of the diluted protein concentrate is controlled to 68 to 95° C., preferably 72 to 88° C.

In a further preferred embodiment, the process according to the invention may be configured such that in step c) the alkaline pH value corresponds to a pH value of pH 11.5.

In a further preferred embodiment, the process according to the invention may be designed such that in step c) the residence time is at most 30 min.

In a further preferred embodiment, the process according to the invention may be designed such that in step c) the alkaline pH corresponds to a pH of pH 12 and the residence time under these reaction conditions is at most 15 min.

In a further preferred embodiment, the process according to the invention may be designed such that the cooling in d) is carried out to below 40° C.

In a further preferred embodiment, the process according to the invention can be designed in such a way that a solid phase from the solid-liquid separation from d), the so-called alkaline pellet, is discharged from the process and supplied for reuse in a biogas plant.

In a further preferred embodiment, the process according to the invention may be designed such that the acidic pH in e) corresponds to a pH of pH=2.5 to 5.5, preferably to a pH of pH=3.7 to 5.3.

In a further preferred embodiment, the process according to the invention can be designed in such a way that the liquid phase produced during the solid-liquid separation in e), the so-called acidic clear phase, is fed to an evaporation.

In a further preferred embodiment, the process according to the invention can be designed in such a way that step f) can be carried out several times.

In a further preferred embodiment, the process according to the invention may be designed in such a way that ethanol and/or water is used as solvent in f).

In a further preferred embodiment, the process according to the invention may be designed in such a way that the protein product from plants and yeasts from g) is dried to a DS content of at least 90 wt. %.

In a further preferred embodiment, the process according to the invention can be designed in such a way that the product phase from f) is subjected to an enzymatic treatment with enzymes, wherein the enzymes are selected from the group comprising: hemicellulases, alpha-amylase, glucoamylase, lipases. This may allow the reduction of interfering substances.

In a further preferred embodiment, the process according to the invention can be designed in such a way that the protein product from plants and yeasts from f) is neutralised to pH=6.5 to 7.5.

In a further preferred embodiment, the process according to the invention may be designed such that the crude protein content of the protein product from plants and yeasts is at least 70 wt. % DS, preferably at least 75 wt. % DS and particularly preferably at least 80 wt. % DS.

Further embodiments of the second aspect of the invention, the protein product from plants and yeasts, are described in more detail below.

A protein product from plants and yeasts according to the present invention has a crude protein content of at least 70 wt. % DS.

The protein product from plants and yeasts may further be characterised in that the crude protein content of the protein product from plants and yeasts is at least 75 wt. % DS, preferably at least 80 wt. % DS.

The protein product from plants and yeasts may have a crude protein content of the protein product from plants and yeasts of 70 to 95 wt. % DS, preferably 75 to 90 wt. % DS and particularly preferably 78 to 85 wt. % DS.

Preferably, the protein product from plants and yeasts can have a solubility in water at pH=7 of at least 95%, preferably of at least 98% and particularly preferably of at least 99.5%.

In a further preferred embodiment, the protein product from plants and yeasts according to the present invention may have a degree of hydrolysis of <10%, particularly preferably <5%.

In a further preferred embodiment, the proportion of the components of the protein product from plants and yeasts with a molecular weight of >100 kDa may be at least 75 wt. % of the protein product from plants and yeasts.

In a further preferred embodiment, the proportion of the components of the protein product from plants and yeasts with a molecular weight of >150 kDa may be at least 50 wt. % of the protein product from plants and yeasts.

In another preferred embodiment, the protein product from plants and yeasts according to the present invention may have a high ability to cold gelation at pH 7.

In another preferred embodiment, the protein product from plants and yeasts according to the present invention may have an oil holding capacity of 1.3 to 3.6 wt. %.

In another preferred embodiment, the protein product from plants and yeasts according to the present invention may have a taste that is not astringent or bitter.

In another preferred embodiment, the protein product from plants and yeasts according to the present invention can improve the emulsifiability of an oil-in-water emulsion and can stabilise for at least two weeks the median value of the volume-related droplet size distribution to less than 10 μm, preferably less than 7 μm, particularly preferably less than 1 μm.

In a further preferred embodiment, the protein product from plants and yeasts according to the present invention can have a foaming capacity of at least 150%, as well as a foaming stability of at least 50% after 10 min, if the fat content is less than 9% of the DS, preferably less than 8% of the DS, particularly preferably less than 7% of the DS.

The solubility behaviour of the proteins of the protein product from plants and yeasts produced by the described process is irreversibly improved.

In the starting material, i.e. in the stillage, the proteins are present undissolved in the acidic and neutral pH range. However, the protein product produced from plants and yeasts can have a high solubility of up to 100% in the neutral pH range. Despite the high solubility, the protein product from plants and yeasts can have a low degree of hydrolysis of <10%, preferably <5%. This allows the product to have very good functional properties, such as high emulsifiability, gellability and foamability. Comparable products, such as soy or pea protein isolates, have a solubility of only 75% maximum at neutral pH and thus poorer functional properties. In the case of known protein products, higher solubilities are only achieved by enzymatic hydrolysis of the proteins, as a result of which these products have a high degree of hydrolysis of significantly more than 10% and consequently poor functional properties.

Practical Example 1

Figure 1:
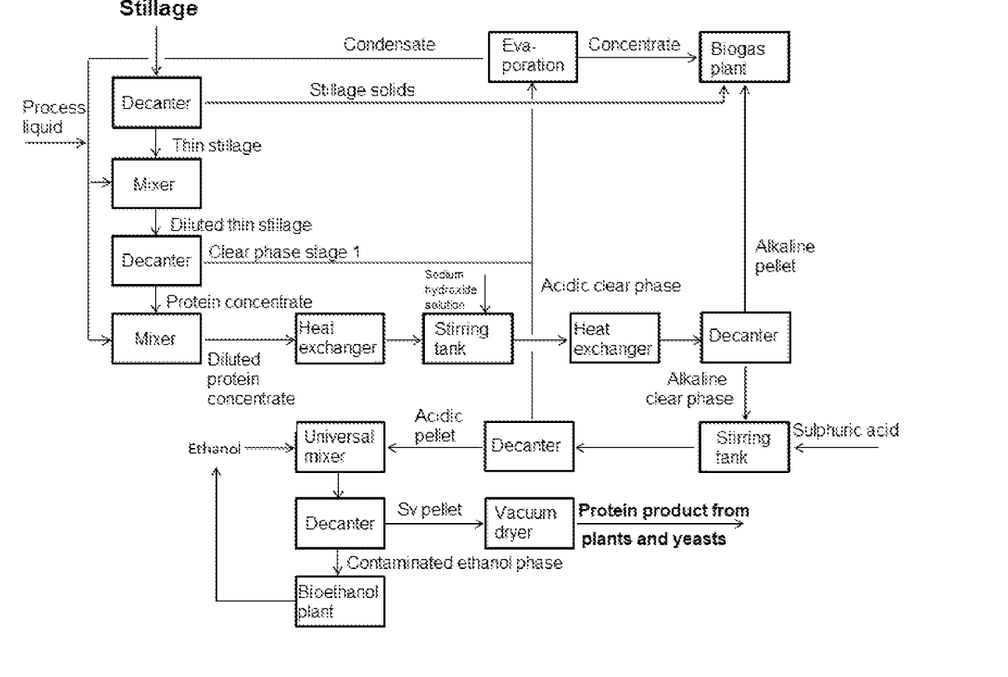
FIG. 1 describes a schematic process sequence of an embodiment of the process according to the invention.

FIG. 1 shows a schematic representation of the process, which is explained below by way of example using the extraction of a protein product from plants and yeasts from wheat-triticale thin stillage.

Step 1: Stillage from the bioethanol process is separated into thin stillage and stillage solids in a decanter, with the stillage solids being supplied to a biogas plant for reuse. The thin stillage has a DS content of 16 wt. % and a crude protein content of 37 wt. % DS.

Step 2: The thin stillage is diluted with an aqueous process liquid to a DS content of 8 wt. %. The aqueous process liquid is a mixture of the condensate from the evaporation of waste water streams as well as condensates from the bioethanol process and other process waters with low DS content (i.e. process waters with a DS content of less than 5 wt. %, preferably less than 3 wt. %, particularly preferably less than 1 wt. %) from the bioethanol process.

Step 3: The diluted thin stillage is pumped to a decanter, which separates it into the protein concentrate and the clear phase stage 1. The protein concentrate has a DS content of 22 wt. % and a crude protein content of 52 wt. % DS. The DS content of the clear phase stage 1 is 5 wt. %.

Step 3A: The clear phase stage 1 is fed to an evaporation, whereby the resulting condensate is recirculated in the process and used for dilution steps (step 2). The evaporated clear phase concentrate is sent to the biogas plant.

Step 4: The protein concentrate is diluted with an aqueous process liquid as described in step 2 to a DS content of approximately 8 wt. % and heated to 82° C. in a heat exchanger. The pH of the heated, diluted protein concentrate is adjusted to pH=12.3 in a stirring tank with concentrated sodium hydroxide solution. The residence time at these conditions is 8 min.

Step 5: After the residence time, the alkaline suspension is cooled to 39° C. using a heat exchanger and then separated into the alkaline pellet and the alkaline clear phase using a decanter. The alkaline clear phase has a DS content of 6 wt. % and a crude protein content of 57 wt. % DS. The DS content of the alkaline pellet is 13 wt. %.

Step 5A: The alkaline pellet is utilised in the biogas plant.

Step 6: For acidic precipitation, the alkaline clear phase is fed into a stirring tank and a pH value of pH=3.8 is set with concentrated sulphuric acid. The acidic suspension is separated into the acidic pellet and the acidic clear phase in a decanter. The acidic pellet has a DS content of 24 wt. % and a crude protein content of 73 wt. % DS. The DS content of the acidic clear phase is 3 wt. %.

Step 6A: The acidic clear phase is fed to an evaporation, whereby the resulting condensate is recirculated in the process and used for dilution steps. The evaporated concentrate is sent to the biogas plant.

Step 7: The acidic pellet is finely dispersed in ethanol, which comes from the bioethanol plant, in a universal mixer. The mass fraction of the acidic pellet in the ethanol suspension in this step is 30 wt. %.

Step 8: The ethanol suspension is then separated into the sv pellet and the contaminated ethanol phase in a decanter. The sv pellet has a DS content of 33 wt. % and a crude protein content of 85 wt. % DS.

Step 8A: The contaminated ethanol phase is fed into the distillation of the bioethanol plant and recovered there.

Step 9: The sv pellet is vacuum dried at 60° C. After completion of the drying process, the protein product from plants and yeasts has a DS content of 93 wt. % and a crude protein content of 85 wt. % DS.

TABLE 1

Practical example 1: DS and crude protein contents of the individual material streams

| Material streams | DS [wt. %] | Crude protein content [wt. % DS] |
|---|---|---|
| Thin stillage | 16 | 37 |
| Diluted thin stillage | 8 | 37 |
| Clear Phase Stage 1 | 5 | |
| Protein concentrate | 22 | 52 |
| Diluted protein concentrate | 8 | 52 |
| Alkaline clear phase | 6 | 57 |
| Alkaline pellet | 13 | |
| Acidic clear phase | 3 | |
| Acidic pellet | 24 | 73 |
| Sv pellet | 33 | 85 |
| Protein product from plants and yeasts | 93 | 85 |

Practical Example 2

In the following, the determination of the optimal parameter settings on a laboratory scale for the extraction of a protein product from plants and yeasts from wheat/triticale thin stillage is explained.

Thin stillage from a bioethanol process has a DS content of 15 wt. % and a crude protein content of 34 wt. % DS.

The thin stillage is diluted with drinking water to a DS content of 8 wt. %.

Subsequently, the thin stillage is centrifuged [4000 xg, 12 min] to separate a protein concentrate from the centrifugate. The crude protein content of the protein concentrate is 50 wt. % DS with a DS content of 25 wt. %.

In preparation for the alkaline treatment, the protein concentrate is diluted to a DS content of 6.2 wt. %. The pH value, temperature and residence time of the alkaline treatment are varied in the following ranges:

TABLE 2

Parameter variation for the alkaline treatment

| Parameter | Minimum | Maximum |
|---|---|---|
| pH value | 10.5 | 12.8 |
| Temperature [° C.] | 25 | 90 |
| Residence time [min] | 5 | 60 |

After the alkaline treatment, the samples are centrifuged (4000 xg, 12 min). Subsequently, the proteins are precipitated in the alkaline clear phase (centrifugate) by adding sulphuric acid to a pH value of pH=3.8. The precipitated proteins are separated by centrifugation (4000×g, 12 min). The resulting acidic pellet is washed with drinking water, the solvent suspension is centrifuged again (4000 xg, 12 min) and the sv pellet is analysed.

The crude protein contents achieved in the sv pellet as well as the yields related to the crude protein in the thin stillage are shown in Table 3 based on 6 parameter combinations of the alkaline treatment.

TABLE 3

Crude protein content and yield in the sv pellet after parameter variation of the alkaline treatment.

| pH value | Temperature [° C.] | Residence time [min] | Crude protein content sv pellet [wt. % DS] | Yield [%], based on thin stillage CP |
|---|---|---|---|---|
| 10.5 | 40 | 45 | 65 | 10 |
| 11.5 | 45 | 60 | 69 | 20 |
| 12.0 | 25 | 30 | 72 | 25 |
| 12.0 | 60 | 30 | 72 | 35 |
| 12.3 | 82 | 8 | 80 | 45 |
| 12.8 | 25 | 15 | 66 | 20 |

The crude protein content as well as the yield in the sv pellet show that the best parameter combination for the alkaline treatment is a pH value of pH=12.3, a temperature of 82° C. and a residence time of 8 min.

Product Analysis

Determination of Emulsifiability

In the present invention, the term "emulsifiability" describes the property of a product to stabilise a shear rate-induced oil-in-water emulsion for at least two weeks at a certain average droplet diameter. To investigate the emulsifiability, a plant protein product is finely ground and suspended with 1.24% DS in distilled water with a magnetic stirrer for 24 h and adjusted to pH 7 with 5 M NaOH while continuously measuring the pH. 50 g of the solution together with 10 g of rapeseed oil are weighed into a beaker. The phases are emulsified for 2 min in the Ultra-Turrax at 17 000 rpm. To reduce the particle size, the emulsion is treated in a Microfluids high-pressure homogeniser (M-110Y Microfluidizer®). For this purpose, 60 mL of the emulsion is added to the feed tank and circulated at 500 bar (approximately 500 mL/min) for 5 min. During this process, the emulsion is pressed through two mixing chambers with shear gaps of 200 and 75 μm each, which leads to a reduction of the droplet size. To evaluate the emulsifiability, the droplet size distribution is determined by dynamic light scattering (Malvern Mastersizer 3000®). For this purpose, the emulsion is carefully turned overhead four times before each sampling to ensure homogeneous sampling. The sample is then taken with a pipette and dispersed in circulating water in the measuring cell until a darkening rate of 5 to 10% is achieved. The evaluation is carried out with the Mie theory using a refractive index of RI=1.45 for proteins and an absorption of 0.001. The median value of the volume-related droplet size distribution (dV, 50) after 2 weeks is used to evaluate the emulsifiability.

Determination of the Ability to Cold Gelation

In the present invention, the term "high ability to cold gelation" describes the property of a product to form a gel at room temperature in an aqueous solution that does not fall out of a beaker turned with the opening downwards for at least one minute. For this purpose, a plant protein product is first finely ground and suspended at a solid concentration of 12.4% in 50 mL of water in a 100 mL beaker and adjusted to pH 7 with 10 M NaOH while continuously measuring the pH and stirred for at least 15 min. Then, the beaker is turned until the opening points downwards and is held in this position for one minute.

Product Components with a Molecular Weight >150 kDa

The weight percentage of the components of the protein product from plants and yeasts with a molecular weight of >150 kDa can be determined via ultrafiltration. In this method, the components of a sample are separated according to a molecular weight limit determined by the membrane permeability of the ultrafiltration membrane, in this case 150 kDa. A 200 mL dead-end ultrafiltration module is used for the ultrafiltration. The protein product from plants and yeasts is finely ground and then 1 wt. % protein product from plants and yeasts is suspended in water for 24 h. The ultrafiltration membranes are placed in an ultrafiltration module and first rinsed with double distilled water for 15 min. Then 30 g of the suspended sample (pH 7, aq. 1 wt. %) are quantitatively poured into the emptied module and stirred at 250 rpm. The pressure is set to 3.5 bar. The ultrafiltration is stopped by depressurising as soon as about 90% of the sample has been collected as permeate. Subsequently, 30 g of double-distilled water are added to the module and the ultrafiltration is restarted until another 30 g of permeate have been collected. This process is repeated a second time and the three permeates are combined. The retentate is then removed from the module. For this purpose, approximately 30 g of double-distilled water are added to the module and stirred at approximately 500 rpm for 30 min to resuspend sample adhering to the membrane. The entire retentate is then quantitatively transferred to a vessel and dried. A similar procedure is then performed with the permeate. Based on the mass of the retentate, the weight proportion of the components of the protein product from plants and yeasts can finally be determined, which corresponds to the proportion of components >150 kDa.

Similarly, the weight percentage of the components of the protein product from plants and yeasts with a molecular weight of >100 kDa can be determined.

Determination of the Degree of Hydrolysis

In the context of the present invention, the degree of hydrolysis refers to the proportion of cleaved peptide bonds in relation to the total amount of amino acids contained and is defined as follows:

Degree of hydrolysis=(number of cleaved peptide bonds in mol/gDS)/(number of amino acids in mol/gDS)

The number of cleaved peptide bonds is determined according to Nielsen et al. (NIELSEN, P. M., PETERSEN, D., DAMBMANN, C. Improved Method for Determining Food Protein Degree of Hydrolysis. Food Science June 2001, Volume 66, Issue 5, p. 642-646). The number of amino acids is determined according to Lamp et al. (LAMP, A., KALDSCHMITT, M., LÜDTKE, O. Improved HPLC-method for estimation and correction of amino acid losses during hydrolysis of unknown samples. Analytical Biochemistry 2018, Volume 543, p. 140-145).

Determination of Solubility

In the context of the present invention, solubility is understood as the property of the protein product from plants and yeasts to be stably suspended in water at a concentration of 5 wt. % without sedimentation. For this purpose, the protein product from plants and yeasts is first finely ground, then stirred into water and adjusted to pH 7 with 10 M NaOH while continuously measuring the pH value and stirred for 24 h. The solubility is determined via the volumetric amount of sedimented substances according to DIN EN 38409 by filling 1000 mL of the suspended sample into a 1000 mL Imhoff funnel (DIN EN 12672) and reading off the volume of the sedimented substances ("sedimented volume") after 2 h at room temperature. The solubility is defined as follows: Solubility=100*("total volume"−"sedimented volume")/("total volume"). The solubility is given in % (corresponding to vol. %).

Determination of Foamability

"Foamability" in the context of the present invention is defined according to "Nisov, A., Ercili-Cura, D., Nordlund, E. (2020). Limited hydrolysis of rice endosperm protein for improved techno-functional properties. Food Chemistry January 2020, Volume 302, [125274]" as the property of a protein product from plants and yeasts to generate a shear rate-induced foam volume in aqueous solution ("foam capacity") which is larger than the original volume of the aqueous solution, as well as to maintain a certain proportion of this foam volume for a certain time ("foam stability").

Determination of the Oil Holding Capacity

In the context of this invention, the "oil holding capacity" is understood to be the proportion by weight of an oil in a protein product from plants and yeasts which remains in the sedimented residue after 30 min mixing time with the protein product from plants and yeasts and after 20 min centrifugation at 3000×g and after pouring off the supernatant and which is in proportion to the dry mass of the protein product from plants and yeasts used. For this purpose, 5 mL rapeseed oil and 0.5 g dried protein product from plants and yeasts are mixed.

Oil holding capacity=(mass of oil used−mass of oil in the supernatant)/dry mass of product used; given in percent by weight (wt. %).

The invention claimed is:

1. A process for producing a protein product, the process comprising:
   a) providing a thin stillage or a thin stillage concentrate obtained from plants and yeasts, wherein the thin stillage comprises organic components of fermented and distilled cereal mash that has not been converted to ethanol, salts and yeast;
   b) separating a protein concentrate from the thin stillage or the thin stillage concentrate from a) by means of solid-liquid separation;
   c) diluting the protein concentrate from b) with an aqueous process liquid to a dry substance content of at most 15 wt. %, controlling the temperature of the diluted protein concentrate to at least 60° C. up to a maximum of 95° C., adjusting the pH of the diluted and temperature-controlled protein concentrate to an alkaline pH, and subsequently reacting the diluted, temperature-controlled, and pH-adjusted protein concentrate at a residence time of at most 30 min to produce a processed protein concentrate;
   d) cooling the processed protein concentrate from c) and subsequently separating a liquid phase by means of solid-liquid separation;
   e) adjusting the pH of the liquid phase from d) to an acidic pH, and then separating a solid phase by solid-liquid separation; and
   f) dispersing the solid phase from e) in a solvent and subsequently separating a product phase by solid-liquid separation, wherein the product phase comprises or includes the protein product.

2. The process according to claim 1, further comprising:
   g) drying the product phase from f) to isolate the protein product.

3. The process according to claim 1, wherein the thin stillage or the thin stillage concentrate from step a) is fed to an oil separation.

4. The process according to claim 1, wherein the thin stillage or the thin stillage concentrate from step a) is diluted with an aqueous process liquid.

5. The process according to claim 1, wherein the temperature in step c) is from 68 to 95° C.

6. The process according to claim 1, wherein, in step c), the alkaline pH is from 10.5 to 12.8.

7. The process according to claim 1, wherein, in step c), the alkaline pH is adjusted to at least 12.0 and a residence time, under these reaction conditions, is at most 15 min.

8. The process according to claim 1, wherein, in step e), the acidic pH is from 2.5 to 5.5.

9. The process according to claim 1, wherein the solvent in step f) corresponds to ethanol and/or water.

10. A protein product produced according to the process of claim 1, wherein the protein product has a crude protein content of at least 70 wt. % DS.

11. The protein product according to claim 10, wherein the crude protein content of the protein product is at least 75 wt. % DS.

12. The protein product according to claim 10, wherein the protein product has a solubility in water, at pH=7, of at least 95%.

13. The protein product according to claim 10, wherein the protein product has a degree of hydrolysis of <10%.

14. The protein product according to claim 10, wherein the crude protein content is 70 to 95 wt. % DS.

15. The protein product according to claim 10, wherein the proportion of the constituents of the protein product with a molecular weight of >150 kDa is at least 50 wt. % of the protein product.

16. The protein product according to claim 10, wherein an oil holding capacity of the protein product is 1.3 to 3.6 wt. %.

* * * * *